United States Patent [19]

Lucas et al.

[11] Patent Number: 4,717,691

[45] Date of Patent: Jan. 5, 1988

[54] FLUORIDE GLASS COMPOSITIONS BASED ON ACTINIDES OR YTTRIUM

[75] Inventors: Jacques Lucas, Betton; Gilles Fonteneau, Chateaugiron, both of France

[73] Assignee: Agence Nationale de Valorisation de la Recherche (ANVAR), Paris, France

[21] Appl. No.: 738,362

[22] Filed: May 28, 1985

Related U.S. Application Data

[63] Continuation-in-part of Ser. No. 373,482, Apr. 16, 1982, abandoned.

[30] Foreign Application Priority Data

Aug. 19, 1980 [FR] France ............................... 80 18139
Aug. 18, 1981 [WO] PCT Int'l Appl...PCT/FR81/00103

[51] Int. Cl.[4] .......................... C03C 3/12; C03C 21/00
[52] U.S. Cl. ........................................ 501/40; 501/30; 501/37; 501/38; 501/904; 501/905
[58] Field of Search ................. 501/40, 151, 904, 905, 501/30, 37, 38, 906

[56] References Cited

U.S. PATENT DOCUMENTS

| | | | |
|---|---|---|---|
| 3,709,827 | 1/1973 | Avzel | 501/40 |
| 4,141,741 | 2/1979 | Lucas et al. | 501/40 |
| 4,328,318 | 5/1982 | Miranday et al. | 501/40 |

FOREIGN PATENT DOCUMENTS 53-120717  10/1978  Japan ..................... 501/40

OTHER PUBLICATIONS

Nikoliza, G. P. et al., "Fluoroberyllate Glasses of $BeF_2$-KF-$AlF_3$-$YF_3$", Izvestiya Akademii Nauk. SSSR Inorganic Materials-vol. 7 (3) 1971 pp. 527-529.

Fonteneau, G. et al., "Une Nouvelle Famille de Verres Fluores Transmietteurs Dans L'Infrarouge, Fluorures Vitreux Dans Les Systems $ThF_4$-$BaF_2$-$MF_2$ (M=Mn, Zn)", Mat. Res. Bull. vol. 15 (8) pp. 1143-1147, 8 Aug. 1980.

Fonteneau, G. et al., "Nouveaux Verres Fluores Transmetteurs Dans L'Infrarouge Dans Les Systems $LnF_3$-$BaF_2$-$ZnF_2$", Mat. Res. Bull vol. 15 (10) pp. 1425-1432, Oct. 1980.

Videau, J. et al. "Sur de Nouveaux Verres Aluminofluores", Revue de Chimie Minerale 16 (1979) pp. 393-399, p. 394 Relied On.

*Primary Examiner*—William R. Dixon, Jr.
*Assistant Examiner*—Karl Group
*Attorney, Agent, or Firm*—Cushman, Darby & Cushman

[57] ABSTRACT

Fluoroglasses, their preparation and intermediate products obtained. These glasses are characterized by containing as the forming element at least about 10% by moles of a metal fluoride or mixture of metal fluorides of the formula $MF_n$, n being a number equal to 3 or 4, M representing a 5f transition metal when n=4 (fluoride $MF_4$) and a 4f transition metal or yttrium when n=3 (fluoride $MF_3$), it being understood that said glasses are free of hydrofluoric acid as the forming element.

31 Claims, No Drawings

FLUORIDE GLASS COMPOSITIONS BASED ON ACTINIDES OR YTTRIUM

This application is a continuation-in-part of our application Ser. No. 373,482 filed Apr. 16, 1982, now abandoned.

This invention has as its object new fluoroglasses based on actinides or yttrium.

It is known that certain chemical compounds, alone or associated with other compounds, make formation of glasses possible.

Development of infrared applications, particularly those using atmospheric windows around 5 microns and 9–10 microns, has led to the search for new transparent materials in these regions, and in particular, for glasses, considering the ease of shaping and preparing them.

Materials traditionally used in these infrared ranges are monocrystalline germanium and chalcogenide glasses derived particularly from sulfur, selenium or arsenic. However, these materials lose their transparency with temperature or are sensitive to the oxygen in the air.

In recent years, use of certain fluoroglasses, particularly glasses with a beryllium fluoride base, have been proposed. However, these glasses are costly, toxic, and their transparency in the infrared range is limited.

Glasses with a base of certain fluorides such as $ZrF_4$, $HfF_4$, $AlF_3$ or $BaPO_3F$ have also been proposed.

Glasses derived from $ZrF_4$ or $HfF_4$ are relatively easy to prepare and use. However, the transparency of these glasses goes only to about 7 microns.

Finally, it should be noted that the formation of glasses with a base of metal fluorides and hydrofluoric acid has been mentioned in the literature. However, it was found that the resulting products were not glasses.

This invention has as its object new fluoroglasses with a base of fluorides of actinides and/or lanthanides. These new glasses offer the advantage of having a notable transparency up to 12 microns.

The fluoroglasses of the invention can be prepared at relatively low temperatures.

Another advantage of the new fluoroglasses of the invention resides in the possibility of including therein fluorides of 3d or 4d transition elements.

These characteristics of fluoroglasses of the invention give them advantageous properties, making possible their use particularly in the optical range using infrared. Their index of refraction and their dispersion of indices are different from those of known fluoroglasses.

This invention has as its object new fluoroglasses characterized by containing as the forming element at least about 10% by moles of a metal fluoride or mixture of metal fluorides of the formula $MF_n$, n being a number equal to 3 or 4, M being a 5f transition metal when n=4 and a 4f transition metal or yttrium when n=3, it being understood that said glasses are free of hydrofluoric acid as the forming element.

Metal fluorides $MF_n$ are therefore those of formula $MF_4$, M being then a metal selected from the group of 5f transition metals (actinides), and those of the formula $MF_3$, M then being a 4f transition metal (lanthanides) or yttrium.

Of the actinides, thorium and uranium are mentioned in particular.

Of the fluoroglasses of the invention there can be mentioned particularly:

1. those that contain up to 50% by moles of fluoride $MF_4$, and, further, in a proportion that can go up to 60% by moles, at least a fluoride of formula $MtF_2$, Mt being a metal selected from zinc and manganese. These glasses, for example, contain 35 to 60% by moles of fluoride $MtF_2$.

These fluoroglasses can further contain as the lattice modifying element, generally in a proportion that can amount to 30% by moles, at least a fluoride of the formula $M_{II}F_2$, $M_{II}$ being a bivalent metal of great ionic radius, greater than 1 Å, selected, for example, from the group consisting of barium, strontium and lead.

These glasses, in particular, are those that are free of fluoride $MF_3$ or which contain no more of it than 5% by moles.

Of the glasses of this category, there will be cited particularly those that contain, by moles, 20 to 50% fluoride $MF_4$, 35 to 60% fluoride $MtF_2$ and 5 to 30% fluoride $M_{II}F_2$.

2. those that contain as forming elements up to 55% by moles of fluoride $MF_3$ and up to 65% by moles of fluoride $MtF_2$, Mt being a metal selected from zinc and manganese.

Of these glasses there can be cited in particular those that further contain, as the lattice modifying element, at least a fluoride of the formula $M_{II}F_2$, $M_{II}$ being a metal of large ionic radius, greater than 1 Å, such as those mentioned above. These glasses generally contain up to 45% by moles of fluoride $M_{II}F_2$.

Of the glasses of this category there will be cited more particularly those that are free of $MF_4$ or which do not contain more of it than 5% by moles.

Of the fluoroglasses of this family there will be cited those that contain from 5 to 55% fluoride $MF_3$, 25 to 65% fluoride $MtF_2$ and 15 to 45% fluoride $M_{II}F_2$.

3. those that contain up to 70% by moles of at least a fluoride $MF_4$ and up to 60% by moles of at least a fluoride $M_1F_3$, $M_1$ being a metal selected from yttrium, erbium, thulium, ytterbium and lutetium.

These fluoroglasses can further contain as a lattice modifying element in a proportion that can amount to 0 to 30% by moles, at least a fluoride of formula $M_{II}F_2$, and/or $MtF_2$, $M_{II}$ and Mt being defined as above.

Of the glasses of this family, there will be cited particularly those that contain 25 to 70% fluoride $MF_4$, 25 to 60% fluoride $M_1F_3$, 0 to 30% fluoride $M_{II}F_2$ and 0 to 30% $MtF_2$.

Of the glasses of this category, there will be cited particularly:

those that are free of fluorides $MtF_2$ or which do not contain more of it than 5% by moles.

those that are free of fluorides $M_{II}F_2$ or which do not contain more of it than 5% by moles.

The fluoroglasses of the invention and in particular those of the three families that have just been described, can further contain, as adjuvant, in a proportion not exceeding in all 10% by moles, at least, a metal fluoride of the formula $M'_{II}F_2$, $M_{III}F_3$ or $M'F_4$, $M_{III}$ being selected from aluminum, chromium and iron III, $M'_{II}$ being a bivalent metal different from $M_{II}$ such as a 3d transition metal (for example, iron, cobalt, nickel) and M' being selected from titanium, hafnium and zirconium.

The invention also has as its object glasses resulting from the mixture of at least two glasses as defined above.

These glasses of the invention can easily be cut and generally resist ambient moisture well. They can be heated, without damage, in the air or under a hydrofluoric acid atmosphere up to temperatures of 250°-350° C. depending on the glass transition temperatures. They can generally be used in installations that can come in contact with products such as fluorine or hydrofluoric acid.

The new glasses of the invention, particularly those with a thorium or yttrium base, exhibit the property, in comparison with fluorozirconate glasses, of having an extremely wide optical window, the widest known for glasses, going 0.25 micron in the ultraviolet to 10 microns in the infrared. Examination of the spectra shows that transparency begins to decrease toward 10 microns to reach still about 65% toward 12 microns.

Moreover, these glasses are very easy to synthesize in large quantity and at very low cost.

The optical properties of the glasses of the invention make it possible to use them especially in optical apparatus, in particular in the infrared region, and also in making optical fibers.

Further, these glasses have good properties of adherence to metals.

The invention also has as its object the process of preparing the glasses defined above. This process is characterized by the fact that the constituent fluorides or corresponding oxides are mixed, in this latter case, with the necessary amount of a fluorinating agent making it possible to transform said oxides into fluorides, by the fact that the mixture of fluorides is melted under a dry, neutral atmosphere, then by the fact that the resulting glass is treated, by the usual methods, to give it the desired shape.

According to a particular embodiment, the molten bath is then tempered by pouring on a brass block then by pressing with a brass cover.

The invention also has as its object fluoride mixtures having the compositions indicated above, obtained as intermediate products in the process of preparing the glasses of the invention.

Of the oxides that can be transformed into fluorides with a fluorinating agent there will be cited, for example, $ThO_2$, $Y_2O_3$, $Yb_2O_3$, $ZnO$, etc.

It will be understood from the preceding description that the invention also comprises the use as glass-forming agent, in the preparation of a fluoride glass free from hydrofluoric acid, of at least one metal fluoride $MF_n$, wherein n is a number equal to 3 or 4, and M is selected from the group consisting of thorium and uranium when n=4 and yttrium when n=3, and especially in the following cases:

when said glass contains as glass-forming agent, from 20 to 50 mole % of $MF_4$, and more particularly when said glass also contains from 35 to 60 mole % of a fluoride $MtF_2$, wherein Mt is a metal selected from zinc and manganese; and wherein said glass also contains as a lattice modifier at least a fluoride $M_{II}F_2$, wherein $M_{II}$ is selected from barium, strontium and lead;

when said glass contains as glass-forming agent from 5 to 55 mole % of $YF_3$, and more particularly when said glass also contains from 25 to 65 mole % of a fluoride $MtF_2$, wherein Mt is selected from zinc and manganese; and wherein said glass also contains as a lattice modifier at least barium fluoride;

when said glass contains as glass-forming agents from 25 to 70 mole % of $MF_4$ and from 25 to 60 mole % of $M_1F_3$, wherein $M_1$ is selected from yttrium, erbium, thulium, ytterbium and lutetium; and more particularly when said glass also contains as a lattice modifier at least one fluoride $M_{II}F_2$ and/or $MtF_2$, wherein $M_{II}$ is selected from barium, strontium and lead, and Mt is selected from zinc and manganese.

The following examples illustrate the invention without, however, limiting it.

EXAMPLE 1

A glass having the following composition (in moles) is prepared:

$ThF_4$: 40% $MnF_2$: 50% $BaF_2$: 10%

The operation is as follows:

A mixture having the following composition (in moles) is prepared:

$ThO_2$: 40% $MnF_2$: 50% $BaF_2$: 10% and this mixture is treated with $NH_4F$, HF used at the fluorinating agent of the thorium oxide, by using twice the theoretical amount of ammonium acid fluoride. In other words, in this case, 320 moles of $NH_4F$, HF are used for 100 moles of the above mixture. The mixture is first brought to 350° C. to fluorinate the oxide, then to 800°-1000° C. to fuse the fluorides.

A brownish yellow glass is obtained.

Similarly, the following (colorless) glasses are prepared (Table 1):

TABLE 1

| Example | % in moles | | | Tg °C. | Tc °C. | Tf °C. |
|---|---|---|---|---|---|---|
| 2 | $ThF_4$:40 | $ZnF_2$:40 | $BaF_2$:20 | 330 | 370 | 690 |
| 3 | $ThF_4$:30 | $ZnF_2$:50 | $BaF_2$:20 | 321 | 353 | 702 |
| 4 | $ThF_4$:40 | $YbF_3$:40 | $BaF_2$:20 | 436 | 482 | 782 |
| 5 | $YF_3$:30 | $ZnF_2$:40 | $BaF_2$:30 | 339 | 362 | 697 |
| 6 | $YbF_3$:20 | $ZnF_2$:50 | $BaF_2$:30 | 334 | 355 | 697 |

Similarly, the following glasses are prepared (TABLE 2):

TABLE 2

| Example | % in moles | | | Color |
|---|---|---|---|---|
| 7 | $LaF_3$:10 | $ZnF_2$:60 | $BaF_2$:30 | colorless |
| 8 | $CeF_3$:10 | $ZnF_2$:60 | $BaF_2$:30 | colorless |
| 9 | $PrF_3$:15 | $ZnF_2$:55 | $BaF_2$:30 | light green |
| 10 | $NdF_3$:15 | $ZnF_2$:55 | $BaF_2$:30 | purplish pink |
| 11 | $SmF_3$:20 | $ZnF_2$:50 | $BaF_2$:30 | very pale yellow |
| 12 | $EuF_3$:20 | $ZnF_2$:55 | $BaF_2$:25 | colorless |
| 13 | $GdF_3$:25 | $ZnF_2$:50 | $BaF_2$:25 | colorless |
| 14 | $TbF_3$:25 | $ZnF_2$:50 | $BaF_2$:25 | colorless |
| 15 | $DyF_3$:30 | $ZnF_2$:45 | $BaF_2$:25 | colorless |
| 16 | $HoF_3$:25 | $ZnF_2$:50 | $BaF_2$:25 | very pale yellow |
| 17 | $ErF_3$:25 | $ZnF_2$:45 | $BaF_2$:30 | pink |
| 18 | $TmF_3$:25 | $ZnF_2$:45 | $BaF_2$:30 | colorless |
| 19 | $LuF_3$:25 | $ZnF_2$:45 | $BaF_2$:30 | colorless |
| 20 | $UF_4$:70 | $YbF_3$:30 | | dark green |
| 21 | $UF_4$:40 | $YbF_3$:60 | | green |
| 22 | $UF_4$:50 | $YbF_3$:40 | $BaF_2$:10 | green |
| 23 | $ThF_4$:33 | $YbF_3$:33 | $ZnF_2$:34 | colorless |
| 24 | $ThF_4$:50 | $TmF_3$:40 | $BaF_2$:10 | colorless |
| 25 | $ThF_4$:40 | $LuF_3$:40 | $BaF_2$:20 | colorless |
| 26 | $ThF_4$:45 | $ErF_3$:45 | $BaF_2$:10 | pink |

Similarly, the following glasses are prepared (TABLE 3):

TABLE 3

| Example | % in moles | | | | Tg | Tc | Tf |
|---|---|---|---|---|---|---|---|
| 27 | $ThF_4$:30 | $YF_3$:23 | $ZnF_2$:32 | $BaF_2$:15 | 340 | 430 | 645 |

TABLE 3-continued

| Example | % in moles | | | | Tg | Tc | Tf |
|---|---|---|---|---|---|---|---|
| 28 | ThF$_4$:35 | YbF$_3$:23.5 | ZnF$_2$:24 | BaF$_2$:17.5 | 355 | 435 | 661 |

Similarly, the following glasses were prepared: (TABLE 4)

TABLE 4

| Example | % in moles | | | | Tg | Tc °C. | Tf |
|---|---|---|---|---|---|---|---|
| 29 | ThF$_4$:40 | MnF$_2$:55 | BaF$_2$:5 | | 310 | 363 | 640 |
| 30 | ThF$_4$:40 | MnF$_2$:50 | BaF$_2$:10 | | 326 | 384 | 664 |
| 31 | ThF$_4$:40 | MnF$_2$:45 | BaF$_2$:15 | | 327 | 376 | 647 |
| 32 | ThF$_4$:35 | MnF$_2$:55 | BaF$_2$:10 | | 317 | 370 | 650 |
| 33 | ThF$_4$:30 | ZnF$_2$:55 | BaF$_2$:15 | | 312 | 325 | 706 |
| 34 | ThF$_4$:30 | ZnF$_2$:50 | BaF$_2$:20 | | 321 | 353 | 702 |
| 35 | ThF$_4$:30 | ZnF$_2$:45 | BaF$_2$:25 | | 334 | 362 | 720 |
| 36 | ThF$_4$:40 | ZnF$_2$:40 | BaF$_2$:20 | | 330 | 370 | 690 |
| 37 | ThF$_4$:45 | ZnF$_2$:35 | BaF$_2$:20 | | 339 | 367 | 706 |
| 38 | YF$_3$:40 | ZnF$_2$:40 | BaF$_2$:20 | | 345 | 385 | 698 |
| 39 | YF$_3$:50 | ZnF$_2$:30 | BaF$_2$:20 | | 363 | 394 | 726 |
| 40 | ThF$_4$:30 | YF$_3$:30 | BaF$_2$:10 | ZnF$_2$:30 | 338 | 425 | 686 |
| 41 | ThF$_4$:28.3 | YF$_3$:28.3 | BaF$_2$:15 | ZnF$_2$:28.4 | 345 | 425 | 686 |
| 42 | ThF$_4$:26.7 | YF$_3$:26.7 | BaF$_2$:20 | ZnF$_2$:26.6 | 353 | 427 | 685 |
| 43 | ThF$_4$:25.5 | YF$_3$:42.5 | BaF$_2$:15 | ZnF$_2$:17 | 369 | 426 | |
| 44 | ThF$_4$:25.5 | YF$_3$:34 | BaF$_2$:15 | ZnF$_2$:25.5 | 355 | 427 | |
| 45 | ThF$_4$:34 | YF$_3$:34 | BaF$_2$:15 | ZnF$_2$:17 | 366 | 429 | |
| 46 | ThF$_4$:34 | YF$_3$:25.5 | BaF$_2$:15 | ZnF$_2$:25.5 | 337 | 429 | |
| 47 | ThF$_4$:32 | YF$_3$:25 | BaF$_2$:13 | ZnF$_2$:30 | 346 | 439 | 680 |
| 48 | ThF$_4$:30 | YbF$_3$:30 | BaF$_2$:10 | ZnF$_2$:30 | 336 | 423 | 663 |
| 49 | ThF$_4$:29.2 | YbF$_3$:29.2 | BaF$_2$:12.5 | ZnF$_2$:29.1 | 339 | 424 | 665 |
| 50 | ThF$_4$:28.3 | YbF$_3$:28.3 | BaF$_2$:15 | ZnF$_2$:28.4 | 344 | 426 | 665 |
| 51 | ThF$_4$:27.5 | YbF$_3$:27.5 | BaF$_2$:17.5 | ZnF$_2$:27.5 | 347 | 427 | 665 |
| 52 | ThF$_4$:26.7 | YbF$_3$:26.7 | BaF$_2$:20 | ZnF$_2$:26.6 | 350 | 422 | 661 |
| 53 | ThF$_4$:40 | YbF$_3$:30 | BaF$_2$:0 | MnF$_2$:30 | 346 | 396 | 670 |
| 54 | ThF$_4$:36 | YbF$_3$:27 | BaF$_2$:10 | MnF$_2$:27 | 356 | 436 | 630 |
| 55 | ThF$_4$:34 | YbF$_3$:25.5 | BaF$_2$:15 | MnF$_2$:25.5 | 358 | 433 | 630 |
| 56 | UF$_4$:50 | YbF$_3$:40 | BaF$_2$:10 | | 385 | 427 | |
| 57 | UF$_4$:60 | YbF$_3$:35 | BaF$_2$:5 | | 379 | 412 | |
| 58 | UF$_4$:50 | Y F$_3$:30 | BaF$_2$:20 | | 386 | 432 | |
| 59 | UF$_4$:40 | Y F$_3$:35 | BaF$_2$:25 | | 397 | 432 | |
| 60 | ThF$_4$:35 | ErF$_3$:26.25 | BaF$_2$:12.5 | MnF$_2$:26.25 | 359 | 422 | 644 |
| 61 | ThF$_4$:35 | TmF$_3$:26.25 | BaF$_2$:12.5 | MnF$_2$:26.25 | 357 | 430 | 638 |
| 62 | ThF$_4$:35 | YbF$_3$:26.25 | BaF$_2$:12.5 | MnF$_2$:26.25 | 358 | 441 | 637 |
| 63 | ThF$_4$:35 | Y F$_3$:26.25 | BaF$_2$:12.5 | MnF$_2$:26.25 | 357 | 423 | 640 |
| 64 | ThF$_4$:40 | YbF$_3$:30 | | MnF$_2$:30 | 346 | 396 | |
| 65 | ThF$_4$:40 | Y F$_3$:30 | | ZnF$_2$:30 | 336 | 374 | 750 |

The following compositions gave glasses, as shown by X-ray diffraction (TABLE 5):

TABLE 5

| Example | % in moles | | | |
|---|---|---|---|---|
| 66 | ThF$_4$:47 | MnF$_2$:43 | BaF$_2$:10 | |
| 67 | ThF$_4$:32 | MnF$_2$:58 | BaF$_2$:10 | |
| 68 | ThF$_4$:40 | MnF$_2$:50 | SrF$_2$:10 | |
| 69 | ThF$_4$:40 | MnF$_2$:50 | PbF$_2$:10 | |
| 70 | ThF$_4$:22 | ZnF$_2$:54 | BaF$_2$:24 | |
| 71 | ThF$_4$:42 | ZnF$_2$:38 | BaF$_2$:20 | |
| 72 | ThF$_4$:32 | ZnF$_2$:43 | BaF$_2$:25 | |
| 73 | ThF$_4$:40 | ZnF$_2$:50 | SrF$_2$:10 | |
| 74 | ThF$_4$:40 | ZnF$_2$:40 | PbF$_2$:20 | |
| 75 | ThF$_4$:35 | ZnF$_2$:45 | PbF$_2$:20 | |
| 76 | UF$_4$:40 | MnF$_2$:50 | SrF$_2$:10 | |
| 77 | UF$_4$:40 | MnF$_2$:50 | BaF$_2$:10 | |
| 78 | UF$_4$:40 | ZnF$_2$:40 | PbF$_2$:20 | |
| 79 | UF$_4$:40 | ZnF$_2$:40 | BaF$_2$:20 | |
| 80 | YF$_3$:30 | MnF$_2$:25 | BaF$_2$:45 | |
| 81 | YF$_3$:30 | ZnF$_2$:30 | BaF$_2$:40 | |
| 82 | YF$_3$:40 | ZnF$_2$:30 | BaF$_2$:30 | |
| 83 | YF$_3$:30 | ZnF$_2$:50 | BaF$_2$:20 | |
| 84 | YF$_3$:20 | ZnF$_2$:40 | BaF$_2$:40 | |
| 85 | YF$_3$:10 | ZnF$_2$:50 | BaF$_2$:40 | |
| 86 | YF$_3$: 5 | ZnF$_2$:60 | BaF$_2$:35 | |
| 87 | YF$_3$:15 | ZnF$_2$:63 | BaF$_2$:22 | |
| 88 | YF$_3$:25 | ZnF$_2$:60 | BaF$_2$:15 | |
| 89 | ThF$_4$:28 | YbF$_3$:28 | SrF$_2$:16 | ZnF$_2$:28 |
| 90 | ThF$_4$:25 | YbF$_3$:35 | SrF$_2$:10 | ZnF$_2$:30 |
| 91 | ThF$_4$:28 | YbF$_3$:28 | PbF$_2$:16 | ZnF$_2$:28 |
| 92 | ThF$_4$:25 | YbF$_3$:35 | PbF$_2$:10 | ZnF$_2$:30 |
| 93 | UF$_4$:25 | YbF$_3$:35 | SrF$_2$:10 | ZnF$_2$:30 |
| 94 | UF$_4$:28 | YbF$_3$:28 | SrF$_2$:16 | ZnF$_2$:28 |
| 95 | UF$_4$:28 | YbF$_3$:28 | PbF$_2$:16 | ZnF$_2$:28 |
| 96 | UF$_4$:35 | YF$_3$:35 | | ZnF$_2$:30 |
| 97 | ThF$_4$:50 | YbF$_3$:35 | SrF$_2$:15 | |
| 98 | UF$_4$:50 | YbF$_3$:35 | SrF$_2$:15 | |

We claim:

1. A fluoride glass having transparency up to 12 microns consisting essentially of
   (1) 5 to 55 mole percent of a fluoride $M_1F_3$ as a forming element wherein $M_1$ is yttrium,
   (2) 25 to 65 mole percent of a fluoride $M_tF_2$ wherein $M_t$ is zinc or manganese,
   (3) 15 to 45 mole percent of a fluoride $M_{II}F_2$ wherein $M_{II}$ is barium, strontium or lead, and
   (4) 0–10 mole percent of an adjuvant consisting of at least one metal fluoride selected from the group consisting of $M'_{II}F_2$, $M_{III}F_3$ and $M'F_4$ wherein $M'_{II}$ is a bivalent metal different from $M_{II}$ and $M_t$, $M_{III}$ is selected from the group consisting of aluminum, chromium and iron III and $M'$ is selected from the group consisting of titanium, hafnium and zirconium, said fluoride glass being free of hydrofluoric acid as a forming element.

2. The fluoride glass of claim 1 wherein $M_{II}$ is barium.

3. A fluoride glass having transparency up to 12 microns consisting essentially of
   (1) 5 to 55 mole percent of a fluoride $M_1F_3$ as a forming element wherein $M_1$ is yttrium,
   (2) 25 to 65 mole percent of a fluoride $MtF_2$ wherein Mt is zinc,
   (3) 15 to 45 mole percent of a fluoride $M_{II}F_2$ wherein $M_{II}$ is barium, and
   (4) 0 to 10 mole percent of an adjuvant consisting of at least one metal fluoride selected from the group consisting of $M'_{II}F_2$, $M_{III}F_3$ and $M'F_4$ wherein
   $M'_{II}$ is a bivalent metal different from $M_{II}$ and Mt,
   $M_{III}$ is selected from the group consisting of aluminum, chromium and iron III and
   $M'$ is selected from the group consisting of titanium, hafnium and zirconium,
   said fluoride glass being free of hydrofluoric acid as a forming element.

4. A hydrofluoric acid free fluoroglass having a transparency up to 12 microns consisting of 33 mole percent $ThF_4$, 33 mole percent $YbF_3$ and 34 mole percent $ZnF_2$.

5. A hydrofluoric acid free fluoroglass having a transparency up to 12 microns consisting of 30 mole percent $ThF_4$, 23 mole percent $YF_3$, 32 mole percent $ZnF_2$ and 15 mole percent $BaF_2$.

6. A hydrofluoric acid free fluoroglass having a transparency up to 12 microns consisting of 35 mole percent $ThF_4$, 23.5 mole percent $YbF_3$, 24 mole percent $ZnF_2$ and 17.5 mole percent $BaF_2$.

7. A hydrofluoric acid free fluoroglass having a transparency up to 12 microns consisting of 70 mole percent $UF_4$ and 30 mole percent $YbF_3$.

8. A hydrofluoric acid free fluoroglass having a transparency up to 12 microns consisting of 40 mole percent $UF_4$ and 60 mole percent $YbF_3$.

9. A hydrofluoric acid free fluoroglass having a transparency up to 12 microns consisting of 40 mole percent $ThF_4$, 50 mole percent $MnF_2$ and 10 mole percent $BaF_2$.

10. A hydrofluoric acid free fluoroglass having a transparency up to 12 microns consisting of 40 mole percent $ThF_4$, 40 mole percent $ZnF_2$ and 20 mole percent $BaF_2$.

11. A hydrofluoric acid free fluoroglass having a transparency up to 12 microns consisting of 30 mole percent $ThF_4$, 50 mole percent $ZnF_2$ and 20 mole percent $BaF_2$.

12. A hydrofluoric acid free fluoroglass having a transparency up to 12 microns consisting of 40 mole percent $ThF_4$, 40 mole percent $YbF_3$ and 20 mole percent $BaF_2$.

13. A hydrofluoric acid free fluoroglass having a transparency up to 12 microns consisting of 30 mole percent $YF_3$, 40 mole percent $ZnF_2$ and 30 mole percent $BaF_2$.

14. A hydrofluoric acid free fluoroglass having a transparency up to 12 microns consisting of 50 mole percent $UF_4$, 40 mole percent $YbF_3$ and 10 mole percent $BaF_2$.

15. A hydrofluoric acid free fluoroglass having a transparency up to 12 microns consisting of 50 mole percent $ThF_4$, 40 mole percent $TmF_3$ and 10 mole percent $BaF_2$.

16. A hydrofluoric acid free fluoroglass having a transparency up to 12 microns consisting of 40 mole percent $ThF_4$, 40 mole percent $LuF_3$ and 20 mole percent $BaF_2$.

17. A hydrofluoric acid free fluoroglass having a transparency up to 12 microns consisting of 45 mole percent $ThF_4$, 45 mole percent $ErF_3$ and 10 mole percent $BaF_2$.

18. A hydrofluoric acid free fluoroglass having a transparency up to 12 microns consisting of 20 mole percent $YbF_3$, 50 mole percent $ZnF_2$ and 30 mole percent $BaF_2$.

19. A hydrofluoric acid free fluoroglass having a transparency up to 12 microns consisting of 10 mole percent $LaF_3$, 60 mole percent $ZnF_2$ and 30 mole percent $BaF_2$.

20. A hydrofluoric acid free fluoroglass having a transparency up to 12 microns consisting of 10 mole percent $CeF_3$, 60 mole percent $ZnF_2$ and 30 mole percent $BaF_2$.

21. A hydrofluoric acid free fluoroglass having a transparency up to 12 microns consisting of 15 mole percent $PrF_3$, 55 mole percent $ZnF_2$ and 30 mole percent $BaF_2$.

22. A hydrofluoric acid free fluoroglass having a transparency up to 12 microns consisting of 15 mole percent $NdF_3$, 55 mole percent $ZnF_2$ and 30 mole percent $BaF_2$.

23. A hydrofluoric acid free fluoroglass having a transparency up to 12 microns consisting of 20 mole percent $SmF_3$, 50 mole percent $ZnF_2$ and 30 mole percent $BaF_2$.

24. A hydrofluoric acid free fluoroglass having a transparency up to 12 microns consisting of 20 mole percent $EuF_3$, 55 mole percent $ZnF_2$ and 25 mole percent $BaF_2$.

25. A fluoride glass consisting essentially of
   (1) a glass-forming agent consisting of a fluoride $MF_4$ present in an amount of 20–50 mole percent thereof wherein M is thorium or uranium;
   (2) a further glass-forming agent consisting of a fluoride $M_1F_3$ present in an amount up to 60 mole percent thereof wherein $M_1$ is selected from the group consisting of yttrium, erbium, thulium, ytterbium and lutetium;
   (3) a lattice modifier consisting of at least a fluoride $MtF_2$ present in an amount up to 60 mole percent thereof wherein Mt is zinc or manganese;
   (4) a further lattice modifier consisting of at least a fluoride $M_{II}F_2$ present in an amount up to 30 mole percent thereof wherein $M_{II}$ is barium, strontium or lead; and
   (5) 0–10 mole percent of an adjuvant consisting of at least one metal fluoride $M_{II}'F_2$, $M_{III}F_3$ or $M'F_4$, wherein $M_{II}'$ is a bivalent metal different from $M_{II}$ and Mt, $M_{III}$ is selected from the group consisting of aluminum, chromium and iron III, and $M'$ is selected from the group consisting of titanium, hafnium and zirconium, said glass being free of hydrofluoric acid.

26. The fluoride glass of claim 25 wherein M is thorium.

27. The fluoride glass of claim 26 wherein $M_{II}$ is barium.

28. A fluoride glass consisting essentially of
   (1) 25–70 mole percent of a fluoride $MF_4$ glass-forming agent wherein M is thorium or uranium,
   (2) 25–60 mole percent of a fluoride $M_1F_3$ wherein $M_1$ is yttrium, erbium, thulium, ytterbium or lutetium,
   (3) a fluoride $M_{II}F_2$ present in an amount up to 30 mole percent thereof wherein $M_{II}$ is barium, strontium or lead, (4) a fluoride $MtF_2$ present in an amount up to 30 mole percent thereof wherein Mt is zinc or manganese, and (5) 0–10 mole percent of an adjuvant consisting of at least one metal fluoride $M_{II}'F_2$, $M_{III}F_3$ or $M'F_4$, wherein $M_{II}'$ is a bivalent metal different from $M_{II}$ and Mt, $M_{III}$ is selected from the group consisting of aluminum, chromium and iron III, and M' is selected from the group consisting of titanium, hafnium and zirconium, said glass being free of hydrofluoric acid.

29. The fluoride glass of claim 28 wherein M is thorium.

30. The fluoride glass of claim 29 wherein $M_{II}$ is barium.

31. A fluoride glass consisting essentially of (1) a glass-forming agent consisting of a fluoride $MF_4$ present in an amount of 20–50 mole percent thereof wherein M is thorium or uranium;

(2) a further glass-forming agent consisting of a fluoride $M_1F_3$ present in an amount up to 60 mole percent thereof wherein $M_1$ is selected from the group consisting of yttrium, erbium, thulium, ytterbium and lutetium;

(3) a lattice modifier consisting of a fluoride $M_{II}F_2$ present in an amount up to 30 mole percent thereof wherein $M_{II}$ is barium, strontium or lead; and (4) 0–10 mole percent of an adjuvant consisting of at least one metal fluoride $M_{II}'F_2$, $M_{III}F_3$ or $M'F_4$ wherein $M_{II}'$ is a bivalent metal different from $M_{II}$, $M_{III}$ is selected from the group consisting of aluminum, chromium and iron III, and M' is selected from the group consisting of titanium, hafnium and zirconium, said fluoride glass being free of hydrofluoric acid.

* * * * *